US008095991B2

(12) United States Patent
Bellwood et al.

(10) Patent No.: US 8,095,991 B2
(45) Date of Patent: Jan. 10, 2012

(54) DIGITAL RIGHTS MANAGEMENT OF STREAMING CAPTURED CONTENT BASED ON CRITERIA REGULATING A SEQUENCE OF ELEMENTS

(75) Inventors: Thomas A. Bellwood, Austin, TX (US); Gabriel A. Cohen, San Mateo, CA (US); Travis M. Grigsby, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 12/037,274

(22) Filed: Feb. 26, 2008

(65) Prior Publication Data

US 2009/0217343 A1     Aug. 27, 2009

(51) Int. Cl.
*G06F 7/04* (2006.01)
*G06F 17/30* (2006.01)
*H04N 7/16* (2011.01)
*G06F 15/16* (2006.01)
*G06F 21/00* (2006.01)

(52) U.S. Cl. .............. 726/30; 705/57; 705/59; 709/231
(58) Field of Classification Search ............ 726/30
See application file for complete search history.

(56) References Cited

U.S. PATENT DOCUMENTS

| 5,488,664 A | 1/1996 | Shamir |
| 5,513,272 A | 4/1996 | Bogosian, Jr. |

(Continued)

FOREIGN PATENT DOCUMENTS

JP    2005223458 A    8/2005

(Continued)

OTHER PUBLICATIONS

Arrington, Michael, "Riya 2.0 on the Way; Major Strategy Shift", TECH CRUNCH.COM, Jun. 15, 2006, 1 Page, [Online], [Retrieved on Jan. 14, 2008]. Retrieved From the Internet <http://www.techcrunch.com/2006/06/15/riya-20-on-the-way-major-strategy-shift/>.

(Continued)

*Primary Examiner* — Christian Laforgia
(74) *Attorney, Agent, or Firm* — David A. Mims, Jr.; Amy J. Pattillo

(57) ABSTRACT

A captured content rights controller detects a first portion of streaming captured content and a second portion of the streaming captured content after the first portion of the streaming captured content is detected. The captured content rights controller determines whether rendering the second portion of the streaming captured content after the first portion of the streaming captured content is subject to at least one digital rights management protection rule for streaming captured content as specified by at least one owner of at least one restricted element within the streaming captured content captured independent of distribution of the content by the owner of the at least one restricted element within the streaming captured content by determining whether the first portion and the second portion of the streaming captured content in sequence represent a particular selection of content elements specified in a selection of a plurality of content elements protected by the at least one digital rights management protection rule. The captured content rights controller applies the at least one digital rights management protection rule to restrict rendering of the second portion of the streaming captured content after the first portion of the streaming captured content.

17 Claims, 6 Drawing Sheets

U.S. PATENT DOCUMENTS

| | | |
|---|---|---|
| 6,934,860 B1 | 8/2005 | Goldstein |
| 7,092,568 B2 | 8/2006 | Eaton |
| 7,171,018 B2 | 1/2007 | Rhoads et al. |
| 7,171,558 B1 | 1/2007 | Mourad et al. |
| 7,245,483 B2 | 7/2007 | Feague et al. |
| 7,369,677 B2 | 5/2008 | Petrovic et al. |
| 7,742,624 B2 | 6/2010 | Super et al. |
| 7,778,440 B2 | 8/2010 | Malone |
| 2002/0161996 A1* | 10/2002 | Koved et al. .................. 713/150 |
| 2003/0023561 A1 | 1/2003 | Stefik et al. |
| 2003/0154386 A1 | 8/2003 | Wittkotter |
| 2003/0231186 A1 | 12/2003 | Larson, Jr. et al. |
| 2004/0049694 A1* | 3/2004 | Candelore ..................... 713/200 |
| 2005/0089164 A1 | 4/2005 | Lang et al. |
| 2005/0192904 A1* | 9/2005 | Candelore ....................... 705/51 |
| 2006/0059096 A1 | 3/2006 | Dublish et al. |
| 2006/0059560 A1 | 3/2006 | Montulli |
| 2006/0167803 A1 | 7/2006 | Aydar et al. |
| 2006/0212704 A1 | 9/2006 | Kirovski et al. |
| 2007/0143830 A1 | 6/2007 | Abraham et al. |
| 2007/0270695 A1* | 11/2007 | Keen ............................ 600/448 |
| 2008/0060083 A1* | 3/2008 | Koved et al. ..................... 726/27 |
| 2009/0083856 A1* | 3/2009 | Aisu et al. ....................... 726/26 |
| 2009/0216769 A1 | 8/2009 | Bellwood et al. |
| 2009/0217344 A1 | 8/2009 | Bellwood et al. |

FOREIGN PATENT DOCUMENTS

| | | | |
|---|---|---|---|
| WO | WO 2007/078010 | * | 7/2007 |
| WO | 2007077521 A2 | | 12/2007 |
| WO | 2007077521 A3 | | 12/2007 |

OTHER PUBLICATIONS

Kanellos, Michael, "Smoking Out Photo Hoaxes With Software", CNET NEWS.COM, Feb. 1, 2006, 2 Pages, [Online], [Retrieved on Jan. 14, 2008]. Retrieved From the Internet <http://www.news.com/2102-1008_3-6033312.html?tag=st.util.print>.

No Author, "Windows Tool for Speech Analysis", UCL Dept of Phonetics and Linguistics, Copyright 2007, 2 Pages, [Online], [Retrieved on Jan. 14, 2008]. Retrieved From the Internet <http://www.phon.ucl.ac.uk/resource/sfs/wasp.htm>.

Eakins, John P. et al., "Similarity Retrieval of Trademark Images", IEEE Multimedia, Apr.-Jun. 1998, pp. 53-63, 11 Pages.

Bellwood et al, USPTO Office Action, U.S. Appl. No. 12/037,275, filed Feb. 26, 2008, mailing date Sep. 14, 2010, 20 pages.

Search Report, PCT/EP2009/050817, International Business Machines Corporation, filed Jan. 26, 2009, mailing date May 14, 2009, 9 pages.

Office Action, U.S. Appl. No. 12/037,287, filed Feb. 26, 2008, Thomas A. Bellwood et al, mailing date Mar. 4, 2011, 29 pages.

Office Action, U.S. Appl. No. 12/037,275, filed Feb. 26, 2008, Thomas A. Bellwood et al, mailing date Mar. 18, 2011, 15 pages.

Final Office Action, U.S. Appl. No. 12/037,287, filed Feb. 26, 2008, Thomas A. Bellwood et al, mailing date Oct. 17, 2011, 26 pages.

* cited by examiner

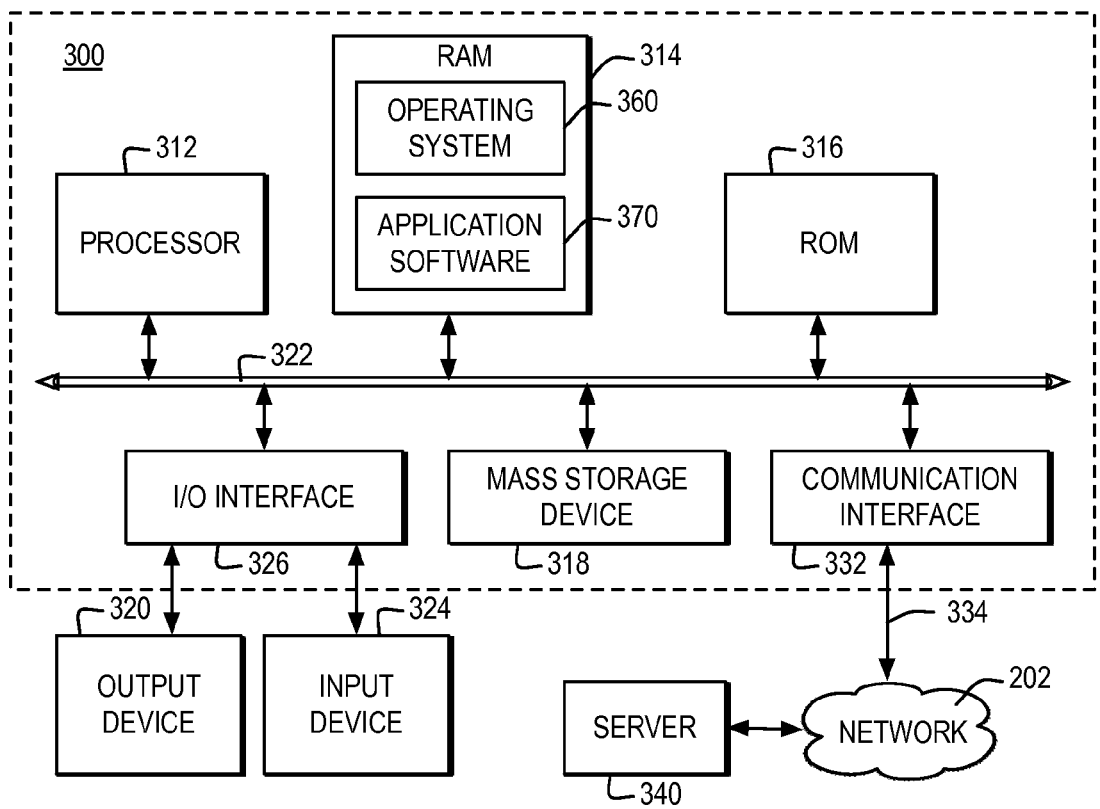
FIG. 3
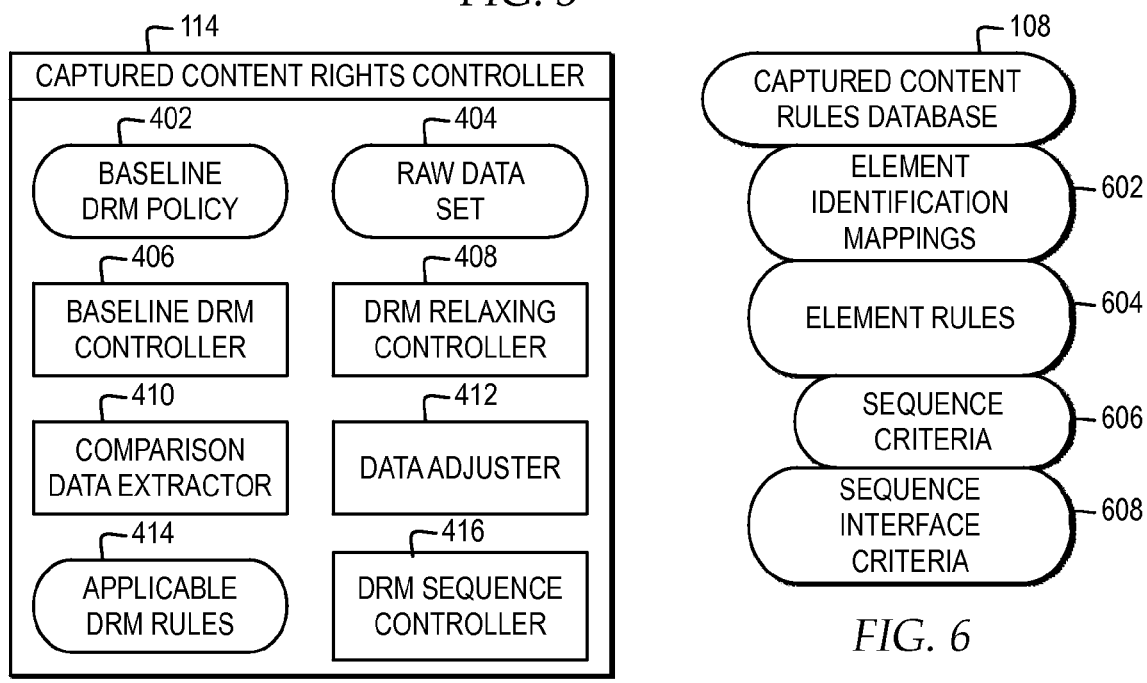
FIG. 4
FIG. 6

DIGITAL RIGHTS MANAGEMENT OF STREAMING CAPTURED CONTENT BASED ON CRITERIA REGULATING A SEQUENCE OF ELEMENTS

CROSS-REFERENCE TO RELATED APPLICATIONS

The present application is related to co-pending applications:

(1) U.S. patent application Ser. No. 12/037,287, filed Feb. 26, 2008; and (2) U.S. patent application Ser. No. 12/037,275, filed Feb. 26-2008; and

BACKGROUND OF THE INVENTION

1. Field of the Invention

The present invention relates generally to improved digital rights management and in particular to an improved method, system, and program product, for digital rights management of streaming captured content based on rules for protecting a sequence of elements detected within streaming captured content.

2. Description of the Related Art

More and more devices and applications are being developed and placed in the marketplace, where the devices are able to capture an image, a sound, or other content. In addition, many of these devices or applications allow capture of an image, a sound, or other content in a digitized format, where the content can then be easily distributed to other devices, transmitted over a network, or uploaded to a website.

Currently, a person or business that owns or manages the rights to content may distribute that content with digital rights management (DRM) rules for restricting use of the content. For example, the owner of rights to a trademark, a song, or a photo, may apply watermarking, encryption, or digital rules when distributing or outputting the content, to attempt to regulate digital usage of the digitized content by others.

Current DRM rules and systems do not, however, protect a content owner against unauthorized use of the content owner's work or image when that content is captured and distributed by another person. In particular, with the increase of portable devices and capture application, there is increased ability for an unauthorized user to capture content at many different locations. The owner of the rights to the content currently does not have a way to manage digital use of this content when captured by others. For example, if a person takes a picture that includes an image of a trademark, while the trademark holder may distribute authorized digital copies with DRM rules attached, the trademark holder does not have a way to manage the rights to use of the trademark captured by another person independent of the authorized digital copies distributed by the trademark owner. In another example, if a user captures a portion of a content owner's copyrighted website and places the captured portion on a blog or other online publication, the copyrighted content owner does not have a way to manage the rights to use of the copyrighted images on another person's online publication. In yet another example, a song owner may distribute authorized digital copies of a song, but if a person makes a digital copy of a song from a physical CD and distributes the digital copy of the song without the permission of the song owner, the song owner does not have a way to manage the distribution of the unauthorized copy of the song.

With the pervasive nature of the Internet and the ease with which captured content can be posted on websites and transmitted worldwide, it is not only businesses with ownership of trademarks and trade secrets, but also copyright holders, individuals, and authorized content distributors who desire to enforce their right to limit use of their physical likeness, who have a need to regulate the use of captured content.

SUMMARY

Therefore, in view of the foregoing, the present invention provides a method, system, process, and computer program product for providing digital rights management of streaming captured content, where the management is specified based rules for protecting a sequence of elements detected within captured content.

In one embodiment, a method, system, and program product provide a captured content rights controller to enable devices to restrict use of streaming captured content, where streaming captured content is content captured independent of an authorized distribution of at least one restricted element within the streaming captured content. The captured content rights controller detects a first portion of streaming captured content and a second portion of the streaming captured content after the first portion of the streaming captured content is detected. The captured content rights controller determines whether rendering the second portion of the streaming captured content after the first portion the streaming captured content is subject to at least one digital rights management protection rule for streaming captured content as specified by at least one owner of at least one restricted element within the streaming content by determining whether the first portion and the second portion of the streaming captured content in sequence represent a particular selection of content elements specified in a selection of a plurality of content elements protected by the at least one digital rights management protection rule. The capture content rights controller applies the at least one digital rights management protection rule to restrict rendering of the second portion of the streaming captured content after the first portion of the streaming captured content.

In detecting the first portion of streaming captured content, the captured content rights controller analyzes the first portion streaming to identify the at least one restricted element subject to at least one digital rights management protection rule when in a sequence with at least one other element. Responsive to identifying the at least one restricted element subject to the at least one digital rights management protection rule when in sequence with the at least one other element, the captured content rights controller analyzes the second portion of the streaming captured content after the first portion of the stream captured content is detected, to identify whether at least one other element is present.

In detecting a first portion of streaming captured content and detecting a second portion of the streaming captured content in a content stream, the captured content rights controller may detect the first portion of streaming captured content and the second portion of the streaming captured content in the content stream comprising multiple content elements playable in sequence. In addition, in detecting a first portion of streaming captured content and detecting a second portion of the streaming captured content, the captured content rights controller may detect the first portion of streaming captured content and the second portion of the streaming captured content for rendering by a player for generating a sequence of the first portion of streaming captured content and the second portion of the streaming captured content within a display area.

In determining whether rendering the second portion of the streaming captured content after the first portion of the streaming captured content is subject to at least one digital rights management protection rule for streaming captured content, the captured content rights controller determines whether the first portion and the second portion of the streaming captured content in sequence represent at least one particular motion subject to restriction under the at least one digital rights management protection rule. In addition, in determining whether rendering the second portion of the streaming captured content after the first portion of the streaming captured content is subject to at least one digital rights management protection rule for streaming captured content, the captured content rights controller requires at least one additional element rendered in a sequence with the first portion of the streaming captured content and the second portion of the streaming captured content.

In applying the at least one digital rights management protection rule to restrict rendering the second portion of the streaming captured content after the first portion of the streaming captured content, the captured content rights controller may apply the at least one digital rights management protection rule to restrict editing of the streaming captured content. In addition, in applying the at least one digital rights management protection rule to restrict rendering the second portion of the streaming captured content after the first portion of the streaming captured content, the captured content rights controller may apply the at least one digital rights management protection rule to restrict uploading of the streaming captured content to a network service server.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a block diagram depicting one embodiment of a computer system in which the present invention may be implemented;

FIG. 4 is a block diagram depicting one example of components of a captured content rights controller (CCRC);

FIG. 6 is a block diagram depicting one example of entries in a captured content rules database for setting DRM rules for restricting access to streaming captured content;

DETAILED DESCRIPTION OF THE PREFERRED EMBODIMENT

Figure 1:
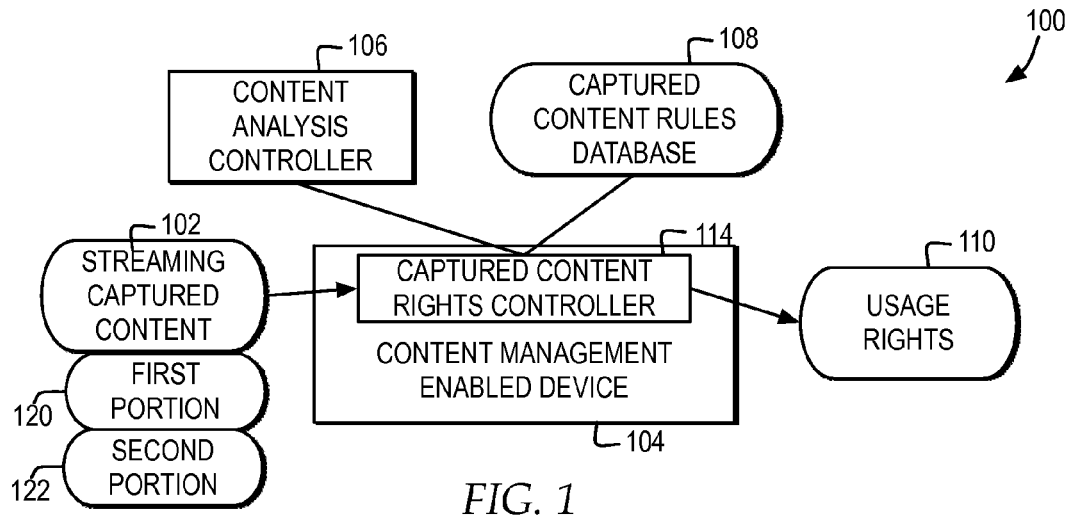
FIG. 1 is a block diagram depicting a digital rights management system for controlling streaming captured content by a device enabled for captured content management.

With reference now to the Figures and in particular with reference now to FIG. 1, FIG. 1 depicts a block diagram of a digital rights management system for controlling captured content by a device enabled for digital rights management of captured content. In the example, content management system 100 controls digital rights management of streaming captured content based on rules for protecting a sequence of elements detected within captured content. It is important to note that in additional or alternate embodiments, content management system 100 may include additional or alternate components and data to the components and data depicted and the components and data depicted may be located within a single computing system or distributed across one or more computing systems via a network or other communication or connection medium.

In the example, content management system 100 includes streaming captured content 102 which may include multiple portions of captured content detected in one or more sequences, illustrated by first portion 120 and second portion 122. Each of first portion 120 and second portion 122 may include one or more elements that when detected in any ordered sequence by a content management enabled device 104, trigger content management enabled device 104 to restrict streaming captured content 102 from unauthorized use. While streaming captured content 102 is illustrated with reference to first portion 120 and second portion 122, it is important to note that streaming captured content 102 may include or be represented by any number of portions and that the portions may stream in one or more different ordered sequences or may overlap. In addition, it is important to note in referring to a sequence of first portion 120 and second portion 122 or a sequence of elements, a sequence may include lapses in time between elements and may include additional elements in sequence between first portion 120 and second portion 122. In addition, it is important to note that in restricting a rendering of first portion 120 and second portion 122, the sequence may be required to include additional elements, such as lapses in time between elements and additional content. Further, it is important to note that in referring to first portion 120 and second portion 122 or a sequence of elements, each portion may include multiple types of content elements and may include different types of content elements.

In the example content management enabled device 104 is enabled to control digital rights management of streaming captured content 102 through a captured content rights controller (CCRC) 114. CCRC 114 detects streaming captured content 102 at content management enabled device 104 and restricts use of captured content 102 until CCRC 114 determines whether any portions of streaming captured content 102 include a sequence of elements which need to be protected against unauthorized use. In particular, CCRC 114 triggers content analysis controller 106 to analyze streaming captured content 102 and identify one or more objects within streaming captured content 102, which are the types of objects which may be subject to DRM rules within captured content rules database 108. Next, CCRC 114 compares the identified objects mappings for elements specified in one or more of captured content rules database 108 to determine any specific DRM rules applicable to the elements in captured content 102. In particular, DRM rules for elements specified in captured content rules database 108 also specify sequence criteria for restricting a sequence of elements when the sequence of elements is detected in streaming captured content 102 in one or more ordered sequences.

If CCRC 114 determines the specific DRM rights from captured content rules database 108 restrict use of streaming captured content 102, then CCRC 114 releases captured content 102 for use in accordance with usage rights 110 which specify the DRM rights to streaming captured content 102. "Use" or "usage" of captured content 102 as specified by sequence usage rights 110, as described herein, may include restrictions on uses including, but not limited to, capturing, receiving, encrypting, accessing, transmitted, transferring, rendering, adding additional content elements, and outputting streaming captured content 102.

In addition, CCRC 114 may determine that no portion of streaming captured content 102 is subject to digital rights management for captured content and release streaming captured content 102 with no usage rights 110 or with usage rights 110 certifying that streaming captured content 102 has been analyzed and approved for any usage. In one example, when streaming captured content 102 is not subject to digital rights management, usage rights 110 may include a signature or a watermark embedded in captured content 102 to certifying the identity of the system authorizing usage.

In the example, streaming captured content 102 may include a content stream of multiple types of rendering including, but not limited to, video images or frames, one or more photographic image, one or more graphical images, and one or more audio sounds. Streaming captured content 102 may include one or more elements in one or more content elements, such as image frames or other identifiable units within first portion 120 and second portion 122 that are restricted by DRM rules when detected in a sequence specified in captured content rules database 108. Streaming captured content 102 may include, but is not limited to, content captured by a device, content captured by an application, or content scanned from a printed image. In addition, streaming captured content 102 may be represented by sequences of portions generated within an application or player that plays multiple types of captured content in a sequence. For example, an application may automatically stream a sequence of images to generate streaming captured content 102, such as a slideshow application for automatically playing a selection of photographic images in a sequence or an advertisement application for automatically displaying a selection of advertisements including images in a sequence embedded on a website or within a separate browser window.

In addition, while streaming captured content 102 is described with reference to content which is captured or used by a user that is not the owner of the rights to the content, captured content 102 may also represent content which is authorized and distributed by an owner of the rights to the content, but captured independent of the distribution by the owner or other authorized entity. Further, captured content 102 may include content that is not yet captured, but is capturable, such as the capturable content within the capture area of a camera device or the content displayed within a web page that is capturable by an application or copy function.

Content management enabled device 104 may represent the device that captures streaming captured content 102, is able to capture streaming captured content 102, receives streaming captured content 102, generates the combination of first portion 120 and second portion 122 of streaming captured content 102, renders streaming content 102, transfers captured content 102, or transmits captured content 102. In addition, in the example, a content management enabled device 104 may represent an application that receives captured content 102, a web service that accesses or delivers captured content 102, or other program, process, or executable that executes on a computing system.

Content analysis controller 106 represents one or more types of content analysis systems. In particular one or more combined or separate content analysis systems may analyze streaming captured content 102 to detect and identify objects which may represent content subject to digital rights management protection including, but not limited to, a person or object, a gesture type, a voice identity, a lyrical composition, and protected marks including, but not limited to, a trademarked image, copyrighted material, monetary images, and images marking content as confidential. As each system implemented as content analysis controller 106 detects and identifies one or more objects in one or more portions of streaming captured content 102, other systems may access the identified objects to detect and identify additional objects in additional portions of streaming captured content 102 or further specify the identified objects within streaming captured content 102. In identifying objects, content analysis controller 106 may perform additional levels of identification, such as facial recognition to identify a person, voice recognition to identify a person or song, and other types of identity recognition.

Although not depicted, content analysis controller 106 may access one or more object databases with mappings and other specifications of different types of objects for use in detecting and identifying objects within streaming captured content 102. In addition, as each system implemented as content analysis controller 106 detects and identifies one or more objects within one or more portions of captured content 102, content analysis controller 106 may access captured content rules database 108 to detect and identify objects which may match restricted elements defined within captured content rules database 108.

In one example, to detect a person or thing and also identify an identity of a particular person or thing, content analysis controller 106 may comprise one or more of a photo or video recognition system for recognizing objects representing people or things within images of streaming captured content 102, converting what is recognized in the image into tags, and looking for other images that are similarly tagged to identify a person, thing, or other type of content, such as looking for similarly tagged images in captured content rules database 108 or another database.

In another example, to detect and identify a particular gesture or motion, content analysis controller 106 may comprise one or more of a gesture or motion detection system for identifying three-dimensional objects within images of streaming captured content 102, comparing the three-dimensional objects with definitions for gestures or motions, and looking for specifications for the gestures or motions in a captured content rules database 108 or another database, where the gestures or motions may be further specified as belonging to a particular person, group of persons, or machine by the image recognition system. A gesture may include a dynamic gesture, such as a performance art, choreographed movements, technique, or expression, or a static position. A motion may include, but is not limited to, a motion by a person, machine, or graphical or video animated entity.

In yet another example, to detect and identify a particular voice, lyrical composition, or other audio composition, content analysis controller 106 may comprise a voice recognition system for sampling a voice, analyzing the characteristics of the voice, and identifying a speaker with the same characteristics as the characteristics of the analyzed voice sample within streaming captured content 102. In another example, content analysis controller 106 may comprise other audio recognition system for sampling music or other audio content from streaming captured content 102, analyzing the characteristics of the sampled music or other audio content, and identifying a musical composition with similar characteristics to the characteristics analyzed in the sampled music or other audio content. In identifying audio within streaming captured content 102, content analysis controller 106 may identify audio at a base level, including identifying notes, instruments, and voices, where different usage rights may apply to each note, instrument or voice or to different ordered sequences of notes, instruments, or voices.

In another example, to detect and identify a protected mark, content analysis controller 106 may comprise a mark recognition system for scanning streaming captured content 102, identifying shapes, colors, patterns, inks, and other distinguishing textual or graphical characteristics of the scan, comparing the identified textual and graphical characteristics of the scan and looking for specifications identifying the origin of the textual and graphical characteristics in a captured content rules database, such as captured content rules database 108 or another database. For example, a mark recognition system may detect a trademark within scanned content or may detect an attempt to copy a monetary image or image marked as confidential.

Captured content rules database 108 may include mappings, definitions, and other specifications for identifying particular elements and the rules for managing licensed usage of the elements when detected within captured content. In addition, captured content rules database 108 may also include encryption keys or other types of keys, which can be released to CCRC 114 for authorizing use of managed elements within captured content.

Rules for managing licensed usage of the elements within streaming captured content may include multiple types of parameters and criteria for establishing usage rights, licensing cost, and other restrictions. In particular, rules for managing license usage of the elements within streaming captured content may be further constrained based on the number of elements included within a sequence of protected elements within streaming captured content and the order of elements included within a sequence of protected elements. In addition, the level of authorized usage of streaming captured content 102 allowed in usage rights 110 may increase or decrease based on the duration of streaming captured content 102 as originally captured or as prepared for output. In another example, usage rights 110 may vary based for restricted elements if one or more of the restricted elements in the sequence were captured from a website, were sequentially generated in an application, or were captured in a photographic image or live audio recording and may vary based on whether the output of the combination of restricted elements is via a website or via a stand-alone application or personal audio device. As previously noted, restrictions on use of streaming captured content 102 may include, but is not limited to, restrictions on capturing, receiving, transmitting, transferring, rendering, or outputting content 102.

In addition, in determining and applying usage rights 110, CCRC 114 may implement or access network based services, such as web crawlers, search engines, and databases which are able to detect the original network location of the image or audio elements captured in streaming captured content 102, to detect the current network location of streaming captured content 102, to detect the different locations within the web interface in which restricted elements of streaming captured content 102 are to be rendered or output, or to detect other network or computer storage location based information relevant to determining the DRM rules for the sequence of restricted elements in captured content 102.

CCRC 114, in applying usage rights 110, may automatically restrict or authorize use of captured content 102, may offer a user options to adjust usage rights 110, may offer a user options to adjust streaming captured content 102, or may provide other options. Examples of application of usage rights 110 of CCRC 114 include, but are not limited to, certifying the authorized usage of captured content 102, adjusting the graphical output by blurring or blocking unauthorized elements within captured content 102, requesting authorization to increase usage rights 110 from the owner of the rights to restricted elements in captured content 102, or canceling the usage of captured content 102.

In particular, in one example of CCRC 114 applying usage rights 110, CCRC 114 may facilitate a user purchase of one or more licenses to adjust the level of authorization of usage of the sequence of elements when used within streaming captured content 102 as specified in usage rights 110. In one example, CCRC 114 may facilitate user purchase of licenses from different owners of the rights to different elements within streaming captured content 102, with each license permitting the sequence of elements within streaming captured content 102.

In one example, a license may vary based on a skill rating or other type of rating of the user capturing the streaming captured content 102. In addition, in another example, the license may vary based on the percentage of the total of each restricted element showing in streaming captured content 102. Further, a license may vary based on the number of intended views, prints, or other output statistic of streaming captured content 102.

In another example, in applying usage rights 110, CCRC 114 may trigger one or more public relations services that receive streaming captured content 102 and require authorization for use of streaming captured content 102 by a public relations professional, attorney, or other authority for determining whether to allow use of captured content 102.

CCRC 114 may also provide a service for blocking, from streaming captured content 102, those portions of streaming captured content 102 including a sequence of restricted elements the user is not granted access to within usage rights 110. In one example, CCRC 114 may apply a filter to streaming captured content 102 to apply a selectable image to those portions of streaming captured content 102 that a user is restricted from using, where the user may select the selectable images to trigger CCRC 114 to access licensing rights to the restricted elements within the blocked portions. In another example, CCRC 114 may provide a service for reordering or directing an application to reorder, within streaming captured content 102, those portions of captured content included restricted elements which usage rights 110 specify are not allowed in the sequence.

Moreover, CCRC 114 may also provide a service for adding, to streaming captured content 102, additional elements or requiring the rendering of additional elements already within streaming captured content 102 as restricted by usage rights 110. For example usage rights 110 may require addition of a disclaimer element specifying the name and contact information for a trademark holder of a trademark within streaming captured content 102. In another example, usage rights 110 may require a specified number of seconds of a quiet, black screen, before or after rendering a video stream of streaming captured content 102. CCRC 114 may add the specified number of seconds of a quiet, black screen or may require display of this portion of streaming captured content 102 if already available.

While in the embodiment content analysis controller 106 and captured content rules database 108 are illustrated as separate components from CCRC 114, in additional or alternate embodiments one or more of content analysis controller 106 and captured content rules database 108 may be implemented by CCRC 114 or within content management enabled device 104.

Figure 2:
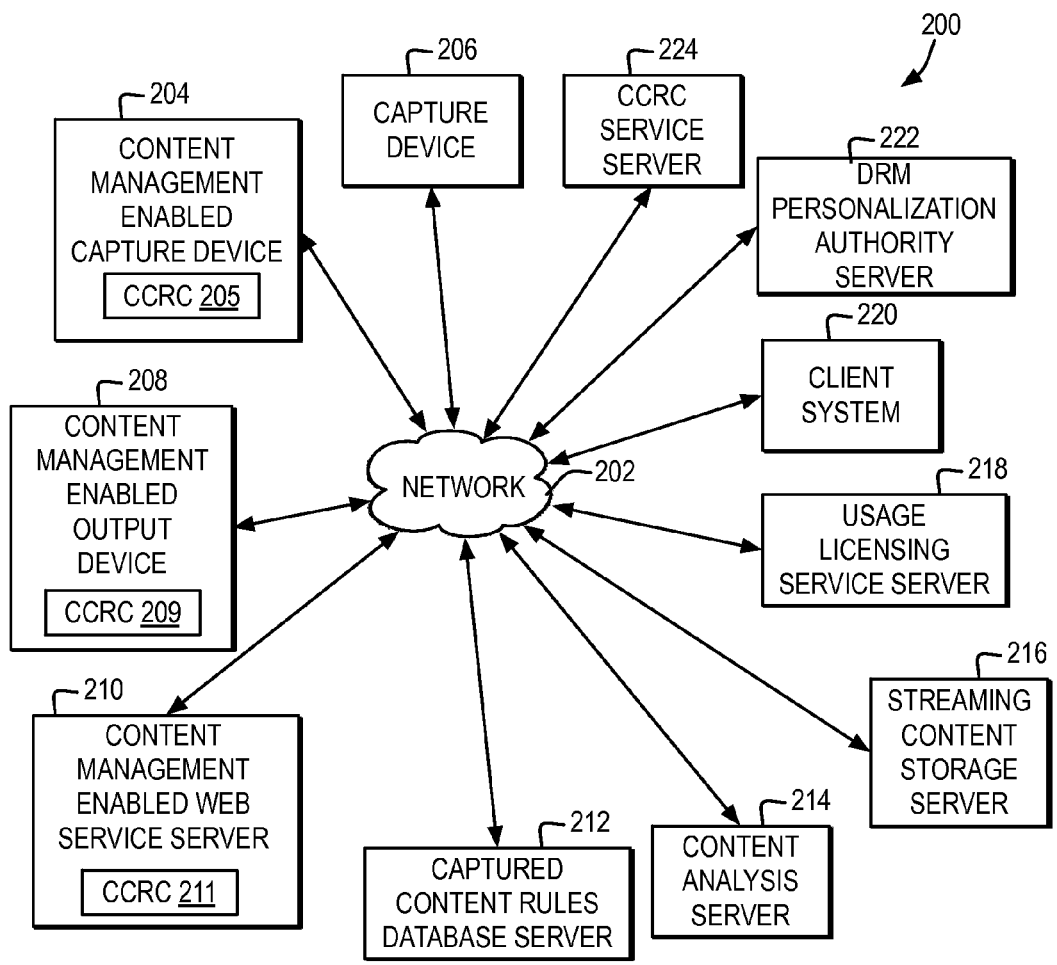
FIG. 2 is a block diagram depicting one example of a network environment in which one or more content management enabled devices control digital rights management for streaming captured content.

With reference now to FIG. 2, a block diagram illustrates one example of a network environment in which one or more content management enabled devices control digital rights management for streaming captured content. It is important to note that network environment 200 is illustrative of one type of network environment that may support one or more types of content management enabled devices, however, devices, client systems, server systems, and other components of a system for supporting content management of captured content may be implemented in other network environments. In addition, it is important to note that the distribution of systems within network environment 200 is illustrative of distribution of systems, however, other distributions of systems within a network environment may be implemented.

As illustrated, multiple systems within network environment 200 may be communicatively connected via network 202, which is the medium used to provide communication links between various devices and computer system communicatively connected. Network 202 may include permanent connections such as wire or fiber optics cables and temporary connections made through telephone connections and wireless transmission connections, for example. Network 202 may represent one or more of packet-switching based networks and telephony based networks, local area and wire area networks, public and private networks.

Network 202 may implement one or more layers of one or more types of network protocol stacks, which may include one or more of a physical layer, a link layer, a network layer, a transport layer, a presentation layer, and an application layer. For example, network 202 may implement one or more of the Transmission Control Protocol/Internet Protocol (TCP/IP) protocol stack or an Open Systems Interconnection (OSI) protocol stack. In addition, for example, network 202 may represent the worldwide collection of networks and gateways that use the TCP/IP suite of protocols to communicate with one another. In other examples, network 202 may implement one or more different types of protocol stacks and other types of protocol stacks.

Network environment 200 may implement multiple types of network architectures. In one example, network environment 200 may be implemented using a client/server architecture, where computing systems requesting data or processes are referred to as clients and computing systems processing data requests and processes are referred to as servers. In the embodiment, as illustrated, one or more systems communicatively connected via network 202 may function as client systems or server systems. In another example, network environment 200 may be implemented in a peer-to-peer network architecture. In yet another example, network environment 200 may be implemented in a grid architecture. It will be understood that other types of network architectures and combinations of network architectures may be implemented in network environment 200.

In one example, network environment 200 may include both a capture device 206 and a content management enabled capture device 204. Both capture device 206 and content management enabled capture device 204 may capture content and distribute the streaming captured content over network 202. Content management enabled captured device 204 is an example of content management enabled device 104 enabled to control digital rights management for streaming captured content through a CCRC 205. In the example, content management enabled capture device 204, based on determined usage rights for restricted elements within the streaming captured content, may, in one example, perform one or more of, blocking capture of the content, graphically mapping the restricted elements within the streaming captured content, automatically deleting streaming captured content, automatically encrypting the streaming captured content, or embedding or affixing the determined usage rights to the streaming captured content for distribution of the streaming captured content over network 202.

Capture device 206 may also be enabled to control digital rights management for streaming captured content through accessing a CCRC service server 224 which provides a CCRC service or a downloadable instance of CCRC 114 to other systems via network 202. In addition or alternatively, other devices within network environment 200 receiving the streaming captured content or detecting capture device 206 when communicatively connected to network 202, may control the digital rights management of any streaming captured content by capture device 206.

In another example, network environment 200 may include a content management enabled output device 208. Content management enabled output device 208 is an example of content management enabled device 104 enabled to control digital rights management for streaming captured content through CCRC 209. In one example, content management enabled output device 208 may be implemented through an application which controls digital rights management of streaming captured content. Examples of applications which may control digital rights management of captured content may include, but are not limited to, a browser, an image or video editing application, a sound editing application, an image display application, a sound or video play application, or an applet or other application which interfaces with a network location. In another example, content management enabled output device 208 may be implemented through an output interface that controls rendering of captured image content or play of captured audio content, for example.

In one example, content management enabled output device 208 may receive streaming captured content which already includes usage rights, such as usage rights managed streaming captured content from content management enabled capture device 204. In addition, content management enabled output device 208 may receive unmanaged streaming captured content, such as streaming captured content from capture device 206. Whether the streaming captured content includes usage rights or not, content management enabled output device 208 may determine what usage rights apply to the streaming captured content for output by content management enabled output device 208. In addition, if received streaming captured content includes usage rights, content management enabled output device 208 may apply the specified usage rights.

In yet another example, network environment 200 may include a content management enabled web service server 210. Content management enabled web service server 210 is an example of content management enabled device 104 enabled to control digital rights management for streaming captured content through CCRC 211. Content management enabled web service server 210 may provide one or more types of services which allow users, such as a user at client system 220 through a browser, to access, download, or stream streaming captured content from content management enabled web service server 210 or upload or store streaming captured content at content management enabled web service server 210. Examples of services provided by content management enabled web service server 210 may include, but are not limited to, a search engine service, a social networking service, an image repository service, or a video repository service. Content management enabled web service server 210 may, for example, block a user from uploading streaming captured content based on usage rights for the combination of elements within the streaming captured content. In another example, content management enabled web service server 210 may block out, distort, or replace one or more elements within the streaming captured content which are restricted based on usage rights from upload, download, or other output.

In another example, content management enabled web service server 210 may adjust the ordering of elements within streaming captured content generated by content management enabled web service server 210 from a combination of available elements. In one example, streaming content storage server 216 may include elements for ordering and playing as streaming captured content through a web page or by a web service. In another example, streaming content storage server 216 may include streaming captured content files for output through a web page or web service.

Any of CCRC 205, CCRC 209, CCRC 211, and CCRC service server 224, in determining what usage rights apply to streaming captured content, may locally implement one or more of content analysis controller 106 and captured content rules database 108. In addition, or alternatively, any of CCRC 205, CCRC 209, CCRC 211, and CCRC service server 224, in determining what usage rights apply to streaming captured content, may access content analysis controller 106 from content analysis server 214, or may access captured content rules database 108 from captured content rules database server 212. Further, network environment 200 may include additional or alternate systems that collectively represent content management system 100.

In addition, as illustrated, for facilitating licensing of usage rights for content, any of CCRC 205, CCRC 209, CCRC 211, and CCRC service server 224 may access a usage licensing service server 218 for negotiating rights to restricted elements within the streaming captured content. In one example, usage licensing service server 218 may facilitate communication and financial transactions between the user requesting access to captured content and one or more of the owners or representatives of the owner of the rights to the restricted elements in the streaming captured content. In another example, usage licensing service server 218 may apply automated rules or polices in selecting whether to grant a license and in selecting a cost of a license for a particular request.

A DRM personalization authority server 222 provides an interface through which a user may personalize preferences, authorization rules, licensing rules, and other instructions with regard to the content that a user owns the rights to restrict. In addition, DRM personalization authority server 222 provides an interface through which a user may upload, record, store, or otherwise provide examples of elements or sequences of elements, which can be captured as streaming captured content 102, that the user owns the rights to restrict or has a preference to restrict. In one example, a user at client system 220, through a browser, may access the personalization interface of DRM personalization authority server 222. In another example, other systems, through other types of applications, such as image editing applications, financial transaction applications, and network communication applications, may access the personalization interface of DRM personalization authority server 222.

DRM personalization authority server 222 may update one or more of captured content rules database server 212, usage licensing service server 218, content analysis server 214, CCRC 205, CCRC 209, CCRC 211, CCRC service server 224, or other systems registered to receive updates responsive to user personalization of DRM rules for content. In addition, systems may periodically request updates on managed content and DRM rules for managed content from DRM content personalization service server 222.

In addition, DRM personalization authority server 222 may provide an interface through which a user may set up a user profile and may personalize usage characteristics. For example, a user may set up a user name and password, transaction account information, profession, intended use of captured content and other information relevant to the usage rights that the user may receive for streaming captured content owned by someone who did not capture the content. In one example, a user profile may identify that the user has a blog and posts captured images on the blog, to trigger specification of usage rights 110 for blog use.

Further, DRM personalization authority server 222 may provide an enforcement authority service for receiving indicators of fraudulent usage, fraudulent certifications, or other unauthorized use by users, websites, or other entities regarding elements within captured content which is owned by registered users of DRM personalization authority server 222. DRM personalization authority server 222 may update a user profile with unauthorized usage indicators and may permit an owner of rights to elements within captured content to set rules that include restrictions based on the unauthorized usage indicators in a requesting user profile.

With reference now to FIG. 3, a block diagram illustrates one embodiment of a computer system in which the present invention may be implemented. The processes, methods, computer program products, and systems of the present invention may be executed in a variety of systems, including a variety of computing systems, such as computer system 300, communicatively connected to a network, such as network 302.

Computer system 300 includes a bus 322 or other communication device for communicating information within computer system 300, and at least one processing device such as processor 312, coupled to bus 322 for processing information. Bus 322 includes low-latency and higher latency paths that are connected by bridges and adapters and controlled within computer system 300 by multiple bus controllers. When implemented as a server, computer system 300 may include multiple processors designed to improve network servicing power. Where multiple processors share bus 322, an additional controller (not depicted) for managing bus access and locks may be implemented.

Processor 312 may be a general-purpose processor such as IBM's PowerPC™ processor that, during normal operation, processes data under the control of an operating system 360, application software 370, middleware (not depicted), and other code accessible from a dynamic storage device such as random access memory (RAM) 314, a static storage device such as Read Only Memory (ROM) 316, a data storage device, such as mass storage device 318, or other data storage medium. Operating system 360, application software 370, or other layers of software may implement the functions performed by a captured content rights controller and by other systems and devices throughout, such as the functions performed by systems and devices described with reference to FIGS. 1 and 2.

Figure 10:
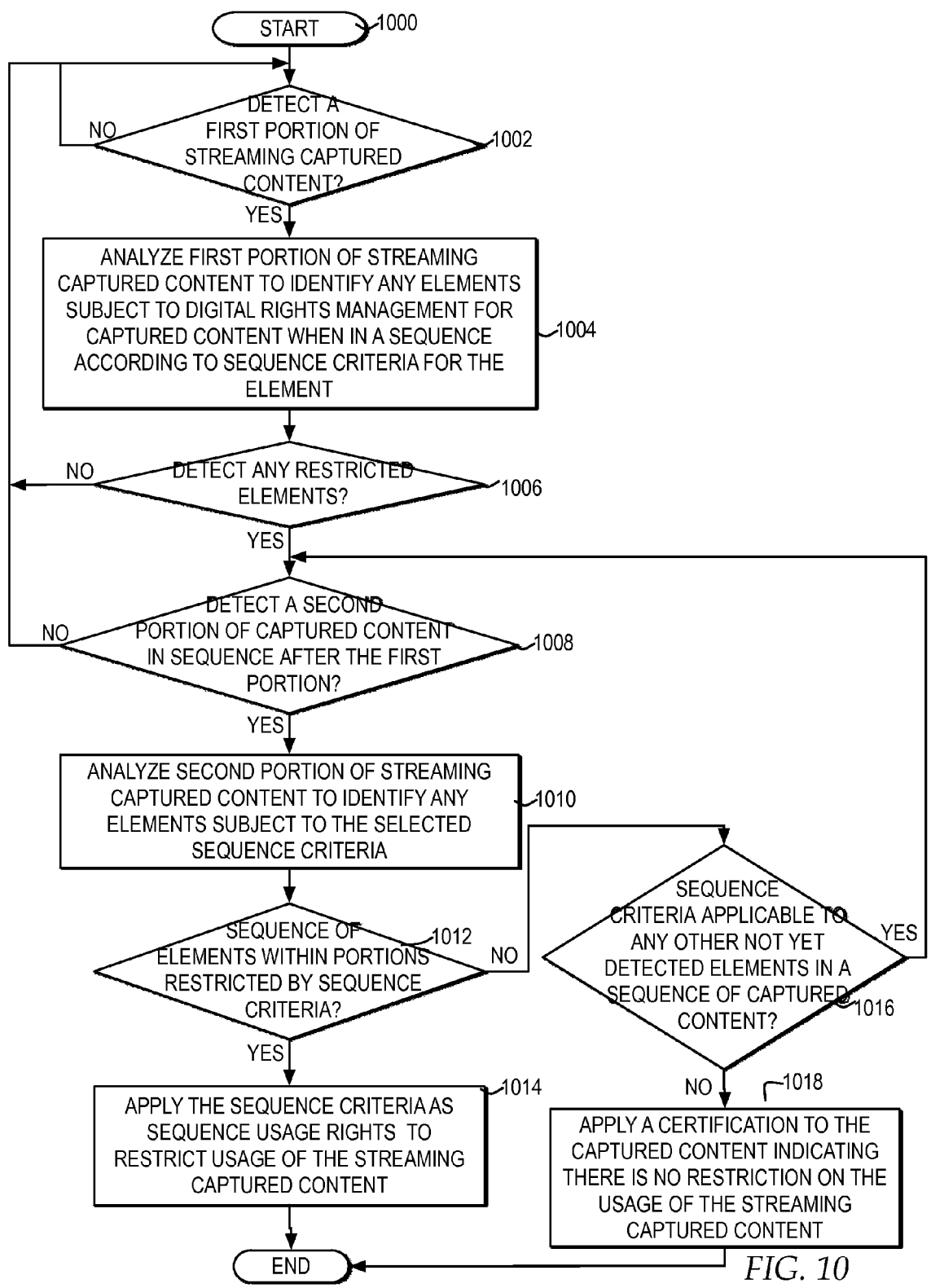
FIG. 10 is a high level logic flowchart illustrating a process and program for digital rights management of streaming captured content.
Figure 11:
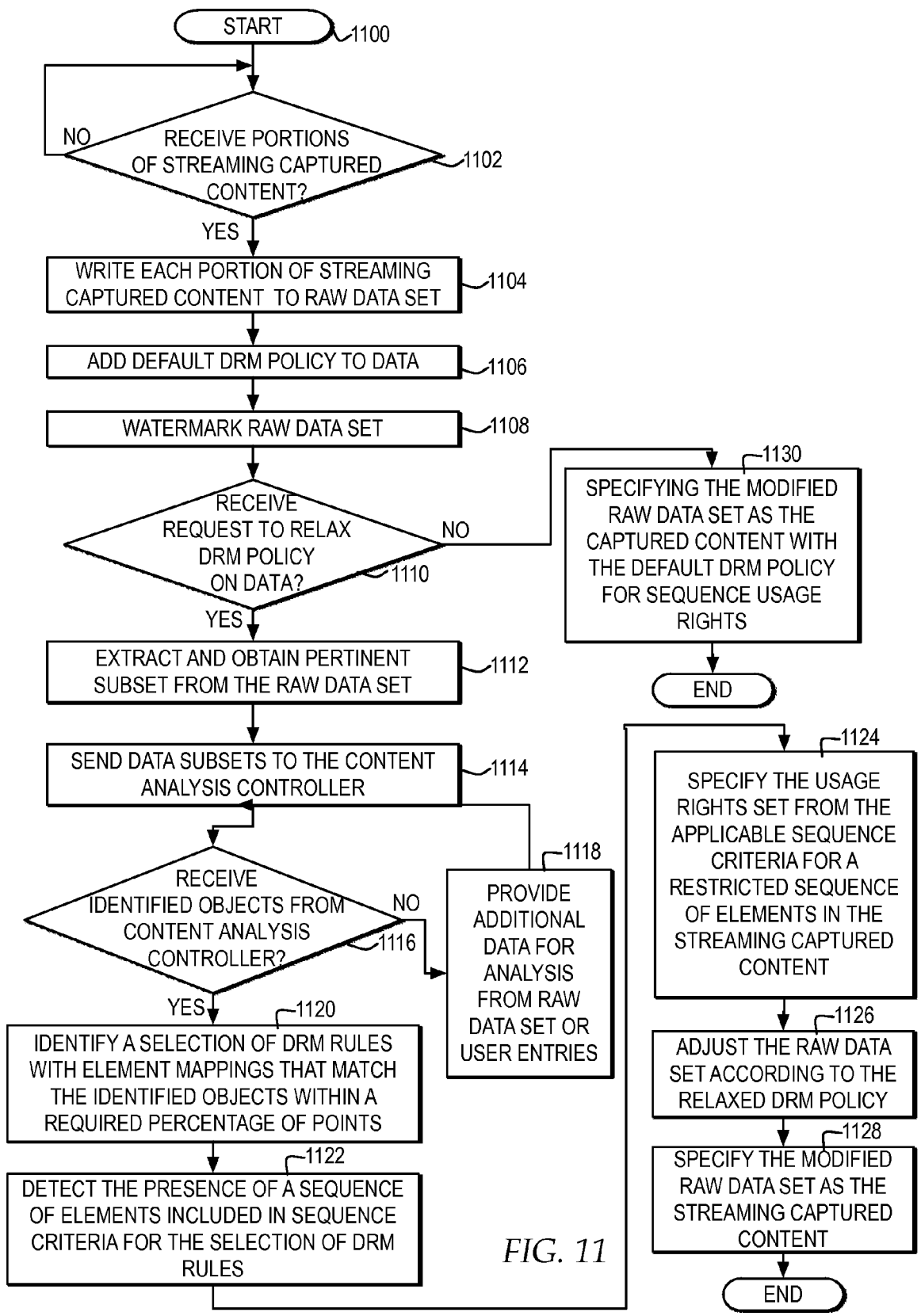
FIG. 11 is a high level logic flowchart depicting a process and program for determining usage rights for controlling digital rights management of streaming captured content.

In one embodiment, the operations performed by processor 312 may control digital rights management of captured content as described in the operations of the flowcharts of FIGS. 10 and 11 and other operations described herein. Operations performed by processor 312 may be requested by operating system 360, application software 370, middleware or other code or the steps of the present invention might be performed by specific hardware components that contain hardwired logic for performing the steps, or by any combination of programmed computer components and custom hardware components.

The present invention may be provided as a computer program product, included on a computer or machine-readable medium having stored thereon the executable instructions of a computer-readable program that when executed on computer system 300 cause computer system 300 to perform a process according to the present invention. The terms "computer-readable medium" or "machine-readable medium" as used herein includes any medium that participates in providing instructions to processor 312 or other components of computer system 300 for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 300 can read and which is suitable for storing instructions. In the present embodiment, an example of a non-volatile medium is mass storage device 318, which as depicted is an internal component of computer system 300, but will be understood to also be provided by an external device. Volatile media include dynamic memory such as RAM 314. Transmission media include coaxial cables, copper wire or fiber optics, including the wires that comprise bus 322. Transmission media can also take the form of acoustic or light waves, such as those generated during radio frequency or infrared data communications.

Moreover, the present invention may be downloaded or distributed as a computer program product, wherein the computer-readable program instructions may be transmitted from a remote computer such as a server 340 to requesting computer system 300 by way of data signals embodied in a carrier wave or other propagation medium via network 202 to a network link 334 (e.g. a modem or network connection) to a communications interface 332 coupled to bus 322. In one example, where processor 312 includes multiple processor elements, then a processing task distributed among the processor elements, whether locally or via a network, may represent a computer program product, where the processing task includes program instructions for performing a process or program instructions for accessing Java (Java is a registered trademark of Sun Microsystems, Inc.) objects or other executables for performing a process. Communications interface 332 provides a two-way data communications coupling to network link 334 that may be connected, for example, to a local area network (LAN), wide area network (WAN), or directly to an Internet Service Provider (ISP). In particular, network link 334 may provide wired and/or wireless network communications to one or more networks, such as network 202. Further, although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

Network link 334 and network 202 both use electrical, electromagnetic, or optical signals that carry digital data streams. The signals through the various networks and the signals on network link 334 and through communication interface 332, which carry the digital data to and from computer system 300, may be forms of carrier waves transporting the information.

In addition, computer system 300 may include multiple peripheral components that facilitate input and output. These peripheral components are connected to multiple controllers, adapters, and expansion slots, such as input/output (I/O) interface 326, coupled to one of the multiple levels of bus 322. Input device 324 may include, for example, a microphone, a photo capture system, a video capture device, a body scanning system, a keyboard, a mouse, or other input peripheral device, communicatively enabled on bus 322 via I/O interface 326 controlling inputs. In addition, an output device 320 communicatively enabled on bus 322 via I/O interface 326 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention. For example, computer system 300 may also be a tablet computer, laptop computer, or telephone device.

With reference now to FIG. 4, a block diagram illustrates one example of components of a captured content rights controller. It is important to note that additional or alternate components, to the components depicted may be implemented within or by CCRC 114. In addition, it is important to note that components illustrated with reference to CCRC 114 may also be implemented by content analysis controller 106 as described in FIG. 1 and may be distributed across one or more systems communicatively connected via network 202, as described with reference to FIG. 2.

Although not depicted, CCRC 114 may include a capturing controller or a receiving controller for capturing or accessing streaming captured content 102. Alternatively, a device or system that is content management enabled by running CCRC 114 may include a capturing controller or an access controller for capturing or receiving streaming captured content 102.

In the example, CCRC 114 implements a baseline DRM controller 406 for detecting streaming captured content 102 which may need to be protected against unauthorized use. Baseline DRM controller 406 may include conversion applications for converting streaming captured content 102 from one format of data into another format of data. In addition, DRM controller 406 may buffer or cache streaming captured content 102.

In one example, baseline DRM controller 406 writes one or more portions of streaming captured content 102 into a raw data set 404 of encrypted data that is only accessible by applications that can authenticate with a trusted root key. For example, the one or more applications that may authenticate using the trusted root key may include, but are not limited to, an application that erases data from the buffers or caches of content management enabled device 104, a comparison data extractor 410, and baseline DRM controller 406. Raw data set 404 may also include additional information about streaming captured content 102, including, but not limited to, the date, time, and location where the content was captured, identification information provided when the content was captured, and other data available to content management enabled device 104 related to the captured content and the environment in which the content was captured.

In addition, in one example, baseline DRM controller 406 may apply a baseline DRM policy 402 to raw data set 404. Baseline DRM policy 402 may specify generic usage rights for a particular user, for a service, or for other entities. In addition, baseline DRM policy 402 may be further specified according to additional criteria, including, for example, but not limited to, location, time of day, and quality of the captured content.

Further, in one example, baseline DRM controller 406 may apply a digital watermark to raw data set 404 at one or more different times. In one example, the digital watermark may include an identifier for CCRC 114, content management enabled device 108 or other identifier that marks the origin of raw data set 404 or marks the origin of the analysis of raw data set 404 to determine what usage rights are available.

Next, CCRC 114 implements a comparison data extractor 410 for extracting one or more subsets of data from raw data set 404 that may be analyzed by content analysis controller 106. In one example, each subset of data may represent a layer of data, where captured content 102 includes multiple image layers or sounds layers. In another example, comparison data extractor 410 may analyze raw data set 404 for data objects representative of people, objects, gestures, motions, or marks and extract each type of data object into a separate subset of data for analysis by content analysis controller 106.

In one example, content analysis controller 106 may determine that one or more of the data subsets extracted by comparison data extractor 410 do not include sufficient detail to provide an identification from the data subsets. Content analysis controller 106 may request that comparison data extractor 410 provide a more detailed data subset and comparison data extractor 410 may extract additional data points from raw data set 404 and send the updated data subset to content analysis controller 106. Content analysis controller 106 may also request a person to review the data subsets and provide additional context information for the data subsets.

In addition, CCRC 114 implements a DRM relaxing controller 408 for receiving one or more identified elements within the one or more data subsets from content analysis controller 106 and comparing the identified elements with rules in captured content rules database 108 to determine if there are DRM rules and policies for the elements detected within streaming captured content 102. Applicable DRM rules 414 represent a selection of one or more rules from captured content rules database 108 which apply to the elements detected within raw data set 404, and which are incorporated into usage rights 110.

In particular, with reference now to FIG. 6, a block diagram illustrates examples of data entries within a captured content rules database, such as captured content rules database 108. In the example, captured content rules database 108 may include element identification mappings 602, where content analysis controller 106 may return an object mapping to CCRC 114 and where DRM relaxing controller 408 compares the object mapping to element identification mappings 602 to identify the elements most closely matching the mapped objects. For example, content analysis controller 106 may return object mappings for a nose, eyes, mouth, and chin, identified from raw data set 404 and DRM relaxing controller 408 compares the object mappings within nose, eye, mouth, and chin mappings in element identification mappings 602 to identify one or more people whose records in element identification mappings 602 match the mapped objects. In another example, content analysis controller 106 may access element identification mappings 602 and match object mappings to element mappings.

In addition, with reference to FIG. 6, DRM relaxing controller 106 accesses DRM rules for elements from element rules 604. Each set of DRM rules within element rules 604 may also include one or more rules or criteria for restricting use of one or more elements. In particular, each set of DRM rules may include sequence criteria 606. Sequence criteria 606 specify the criteria for detecting ordered sequences of elements and sequence criteria 606 specify the restrictions on use of particular ordered sequences of elements when detected within streaming captured content. Sequence criteria 606 may be further specified according capture information such as the location of capture of elements, the type of device used to capture the elements, the skill level of a person capturing the elements and output information, such as whether the elements are sequentially ordered after capture within an application or webpage. In addition, sequence criteria 606 may also specify the criteria for one or more protected ordered sequences of a same set of elements.

In addition, with reference to FIG. 6, an owner or authority over a particular network service may also specify sequence interface criteria 608 within captured content rules database 108 for controlling output of sequences of elements over the network service where subscribers to the network service upload content that is then made available through the network service. By providing sequence interface criteria 608 within captured content rules database 108, in one example, as a user designs a web page or positions content at a local system for upload to the network service server, a CCRC at the local system can determine and preview for the user how a combination of elements within the streaming captured content will be output when accessed through the network service server.

Returning to FIG. 4, by analyzing applicable DRM rules 414 according to combinations of restricted elements, user identity, identity of the system executing CCRC 114, capture quality, ordering of the sequence of elements, output location, and other criteria specified within applicable DRM rules 414, DRM relaxing controller 408 determines whether usage rights 110 should include one or more of each rule within baseline DRM policy 402 and the relaxed set of applicable DRM rules 414 specified by sequence criteria In one example, DRM relaxing controller 408 may embed or affix usage rights 110 to captured content 102, may pass usage rights 110 to data adjuster 412 for enforcement, or may separately transmit usage rights 110 for enforcement by other CCRCs. In addition, DRM relaxing controller 408 may output usage rights 110 in a textual, graphical, audio, or video interface and provide a user with a selectable option to request to adjust the level of authorization provided to the user for streaming captured content 102 in usage rights 110. In one example, responsive to a user request to adjust the level of authorization provided to the user for streaming captured content 102, DRM relaxing controller 408 may access usage licensing service server 218 to coordinate the acquisition of an additional license for the requested level of authorization.

Further, DRM relaxing controller 408 may output usage rights 110 and may output descriptions of the identified elements with streaming captured content 102 with a selectable option for a user to certify that streaming captured content 102 does not include the identified elements or identified sequence of elements or to protest or contest the restriction upon use of the identified element within captured content. For example, DRM relaxing controller 408 may receive identified elements from content analysis controller 106 identifying streaming captured content 102 as including an image of a person performing a dance move, where the creator of the dance move has set managed content rules through DRM content personalization service server 222 to restrict play of images of the dance move. In the example, DRM relaxing controller 408 provides the user with an option to certify that captured content 102 does not include an image of the dance move By the user certifying that streaming captured content 102 does not include the dance move identified by content analysis controller 106, DRM relaxing controller 408 embeds a certification by the user that streaming captured content 102 does not include the identified images. In addition, DRM relaxing controller 408 may transmit the content with the certification to DRM content personalization service server 222 or usage licensing service server 218 for further monitoring. Further, DRM relaxing controller 408 at any device enabled with policy based rights controller 114 may enforce the certification or detect an unauthorized use of the certification by monitoring other information associated with streaming captured content 102 within a display area, such as with captions, tags, or other content associated with streaming captured content 102, to determine whether the user later associated streaming captured content 102 with the originally identification of elements within streaming captured content 102. For example, if CCRC 211 of content management enabled web service server 210 detects the user upload streaming captured content 102 and tag streaming captured content 102 with the name of the dance move originally identified by content analysis controller 106, then CCRC 211 may block use of streaming captured content 102 or report the certification discrepancy to DRM content personalization service server 222 or other services for monitoring content usage.

CCRC 114 also includes a data adjuster 412. Data adjuster 412 may adjust raw data set 404 and output the adjusted raw data set 404 as update streaming captured content 102 with adjusted raw data set 404. In one example, data adjuster 412 may cancel, blur, or distort all or portions of raw data set 404. In another example, depending on the DRM rules finally determined by DRM relaxing controller 408, data adjuster 412, in response to the DRM rules not allowing usage of all or a portion of streaming captured content 102, may erase all or portions of raw data set 404 and captured content 102 from any buffers or caches holding all or portions of raw data set 404 and captured content 102. Further, data adjuster 412 may add graphic, audio, or video elements to raw data set 404 to indicate limitations on use of the data on different platforms, such as showing within a viewfinder the limitations on use of streaming captured content if uploaded to a network service.

Figure 5:
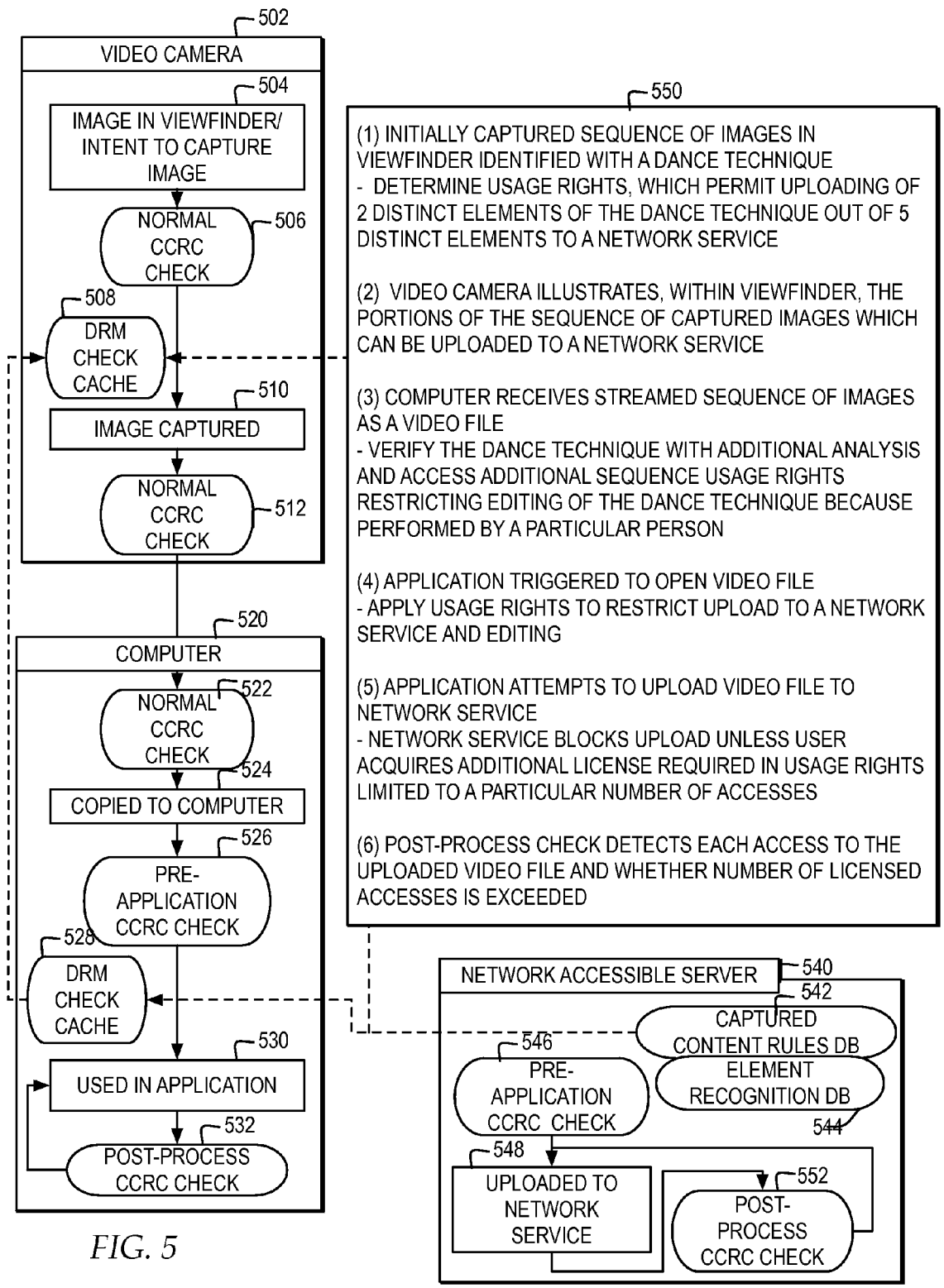
FIG. 5 is a block diagram depicting one example of a content management enabled camera, a content management enabled computer, and a content management enabled network accessible system, for restricting use of captured content subject to digital rights management protection.

Referring now to FIG. 5, a block diagram illustrates one example of a content management enabled camera, a content management enabled computer, and a content management enabled network accessible system, for restricting streaming captured content. In the example, multiple instances of CCRC 114 are illustrated as triggered at different points in time within different systems, as represented by normal CCRC check 506, normal CCRC check 512, normal CCRC check 522, pre-application CCRC check 526, pre-application CCRC check 546, post-process CCRC check 532, and post-process CCRC check 550. It is important to note that in additional or alternate embodiments, additional instances of CCRC 114 may be triggered or only selections of the instances of CCRC 114 illustrated may be triggered.

A log 550 represents an example of a portion of a log file attached to the streaming captured content for certifying the analysis and restriction performed by each of the instances of CCRC 114. It will be understood that log 550 is depicted for purposes of illustrating the flow of streaming captured content through multiple CCRC check points and that log 550 may include additional or alternate entries and may include additional or alternate types of information.

In the example, a camera 502 is able to capture a sequence of images including, but not limited to, still images and video images. Camera 502 may include additional functions to enable capture of three-dimensional images. In addition, camera 502 may capture audio, scan an image, or perform other types of image capture.

In particular, in the example, as illustrated at reference numeral 504, camera 502 may include a viewfinder that pre-captures a sequence of images within a capture area of camera 504 or camera 504 may receive input that a user intends to capture an the images within the view of the capture area of camera 502. For example, to receive input that a user intends to capture the images within the view of the capture area of camera 502, camera 502 may implement a trigger that a user presses or touches in one position to trigger an auto-focus feature. The pre-captured image in the viewfinder or the image a user indicates an intention to capture may represent captured content 102.

Responsive to detecting images in a viewfinder or detecting an intent to capture images at reference numeral 504, normal CCRC check 506 is triggered. Normal CCRC check 506 may determine the elements within the images, determine the DRM rights for each of the elements, and determine whether a next image detected in the viewfinder includes elements which when detected in sequence with the first set of elements are restricted by sequence criteria enforced in usage rights 110. If the usage rights indicate that capture of the images is restricted, normal CCRC check 506 may perform one or more of blurring unauthorized elements within the viewfinder, obtaining or purchasing additional usage rights to the elements if captured in the sequence depicted in the images to be, permitting the user to certify that the sequence of images to be captured does not contain the unauthorized elements identified by normal CCRC check 506, blocking, canceling or disallowing image capture of one or more elements, setting the sequence of images to be auto-encrypted if captured until additional usage rights can be accessed, or setting the image to be automatically deleted if the user selects to capture the image. In one example, data adjuster 412 may block the functionality of camera 502 to prohibit image capture or may adjust the capturable image within a viewfinder according to usage rights determined by normal CCRC check 506. In another example, data adjuster 412 may automatically adjust a feature of the camera, such as a zoom, a crop, a flash, or other feature that controls the quality and capture area of camera 502 to restrict image capture according to the usage rights determined by normal CCRC check 506.

If normal CCRC check 506 allows the user to capture one or more images in sequence, then when the images are captured, as illustrated at reference numeral 510, a normal CCRC check 512 is triggered to restrict usage of the captured stream of images. The image captured by camera 502 at reference numeral 510 may represent streaming captured content 102.

Responsive to detecting the images captured at reference numeral 510, an instance of CCRC 114 is triggered as illustrated by normal CCRC check 512 to determine whether use of the images captured at reference numeral 510 is in compliance with previously determined usage rights by normal CCRC 506 and whether additional or alternate usage rights need to be applied for usage of the images captured at reference numeral 510. In addition, normal CCRC check 512 may be triggered if camera 502 transmits or stores the image captured at reference numeral 510, to determine whether additional usage rights should be embedded or attached to the image captured at reference numeral 510 when distributed to other systems or stored in another data storage location.

In particular, normal CCRC check 512 applies any usage rights already determined and may determine whether additional or alternate usage rights apply. If usage of the captured images is restricted by the determined usage rights, normal CCRC check 512 may perform one or more of blurring unauthorized elements in the images, obtaining or purchasing additional usage rights to the sequence of elements in the captured images, permitting the user to certify that the captured images do not contain unauthorized elements identified by normal CCRC check 512, blocking, canceling, or deleting the captured images, or auto-encrypting the captured images until rights to use of unauthorized elements within the image can be obtained. In one example, responsive to the determined usage rights for the captured images, data adjuster 412 may block the functionality of camera 502 from allowing a user to view, store, or transmit the captured images or may automatically delete the captured images from the cache, buffers, or other storage systems of camera 502.

In the example, normal CCRC check 506 and normal CCRC check 512 may access DRM check cache 508 which may include element identification mappings, DRM rules with sequence criteria, and other data accessed from captured content rules database 542 from network accessible server 540. In addition, DRM check cache 508 may also include records accessed from a separate element recognition DB 544 with additional or alternate descriptions for one or more elements, such as people and trademark images. For example, DRM check cache 508 may access records from element recognition DB 544 which allow identification of a larger number of elements, some of which may include additional mappings in captured content rules database 542. Camera 502 may implement content analysis controller 106 locally or access a content analysis server service, such as from content analysis server 214 via network 202.

In particular, DRM check cache 508 may be initially specified with element mappings or element recognition records that are reduced in resolution and size, since the storage size of DRM check cache 508 may be small. In addition, the records in DRM check cache 508 may be further specified for a particular location, event, or other environment. In one example, DRM personalization authority server 222 may have access to the locations of registered owners of rights to images, such as through receiving updates from a GPS sensor tracking an owner location, through accessing a calendar of an owner, or through other received information indicating an owner's location. DRM personalization authority server 222 may specify the captured content rules database 542 and element recognition database (DB) 544 for a location, event or other environment to include location based element rules, element mappings, and element recognition records most relevant to a particular location, event or other environment. A user of camera 502 may select to receive location, event, or environment specific updates or camera 502 may broadcast a current location, event or environment to DRM personalization authority server 222 and request updates based on the current location, event or environment.

In one example, DRM personalization authority server 222 may track which registered owners are attending a particular event and which registered camera owners are planning to attend the particular event and update DRM check cache 508 in the cameras of registered camera owners with more detailed element recognition descriptions for the registered owners planning to attend a particular event. In another example, when a user enters a restricted area, the owner of the restricted area may request that DRM personalization authority server 222 locally broadcast updates to DRM check caches 508 of authorized cameras with the rules and content descriptions and identity descriptions for the restricted area and the owner of the restricted area may only permit cameras within the area that are content management enabled cameras.

In addition, although not depicted, camera 502 may determine a location locally or by accessing a location detector service from a network accessible server 540. In one example, locally, camera 502 may include a GPS sensor that detects a location. In another example, locally, content descriptions in DRM check cache 508 may specify that content for a particular location, such that if camera 502 captures images that match the content for a particular location, normal CCRC check 506 or normal CCRC check 512 can infer the location of the camera. In addition, normal CCRC check 506 and normal CCRC check 512 may prompt a user of camera 502 to speak a location, which a speech-to-text converter converts into a text location, or to enter a location through a keypad. DRM check cache 508 may also include a directory of locations that a user can scroll through and select within a display interface on camera 502 to specify a location.

In the example, by performing one or more of normal CCRC check 506 and normal CCRC check 512 at camera 502, camera 502 can prevent a user from capturing unauthorized elements within a sequence of images, to save the user time and money by notifying the user that the streaming captured images could not be distributed within physical or network marketplaces, publications, websites, or other venues without permissions and by notifying the user of the owners of the rights to the sequence of elements within the captured images, the likelihood of license availability for the elements, and the cost of licensing usage of the elements. In addition, in the example, by performing one or more of normal CCRC check 506 and normal CCRC check 512 at camera 502, usage rights are determined before images are captured or with image capture, and a user can be notified, at camera 502, how to obtain rights to further usage of images or how to adjust a capture area for increased usage of streaming captured images.

In the example, computer 520 receives a communication or transmission of the images captured at reference numeral 510, which triggers a normal CCRC check 522 to determine whether copying of the images captured by camera 502 is permitted by computer 520 according to usage rights received with the images or by analyzing the images to determine usage rights. Normal CCRC check 522 represents an instance of CCRC 114. Computer 520 represents a content management enabled device 104, such as content management enabled output device 208.

In the example, normal CCRC check 522 may regulate use of the copied captured images based on the usage rights received with the captured image from camera 502. In addition, normal CCRC check 522 may separately determine usage rights for the captured image copied to computer 520. In applying the usage rights, if restrictions are placed on copying the captured image to computer 520, then normal CCRC check 522 may blur unauthorized elements within the captured image, may adjust positions of elements within the captured image, may direct the user to obtain or purchase additional usage rights for copying the captured images, may prompt the user to certify that the elements within the captured images are not the unauthorized element detected by normal CCRC check 522 or a previous CCRC instance, cancel the copying of the captured images, or delete the captured images from all buffers, caches, and other memory of computer 520.

In the example, in addition to or as an alternative to normal CCRC check 522 authorizing copying of the captured images to computer 520, pre-application CCRC check 526 determines whether there are restrictions on an application on computer 520 using the captured images. In particular, an application may trigger pre-application CCRC check 526 or pre-application CCRC check 526 may monitor for an application receiving images, to determine what usage rights apply to the application usage of the captured images.

In determining usage rights for usage of the captured images by an application, pre-application PRBC check 526 may also detect whether the captured images are appropriate for a particular application. For example, some images may have restricted use under HIPAA or other regulatory acts or rules and pre-application CCRC check 526 may determine whether the content of the captured images includes elements which are protected under HIPAA and should only be opened within applications which are approved under HIPAA.

In addition, in determining usage rights for usage of the captured images, a pre-application CCRC check 526 may also detect what types of functions provided by the application are authorized for use with the captured images. For example, an application may include a cropping function, which enables cropping the captured images, however the usage rights for the element within the captured image may prohibit cropping one or more of the sequence of elements in any manner, such that pre-application CCRC check 526 may disable the cropping tool or may limit the cropping tool to cropping areas of the captured image that do not include the restricted elements. In another example, an application may represent a browser, where a user may access a social networking website via the browser, but if the usage rights for a sequence of captured images that the user requests to open in the browser limit usage to local usage, then pre-application CCRC check 526 may block any functions of the social networking site that allow uploading or saving a sequence of images to a memory location outside of computer 520.

As illustrated in log 550, in one example, normal CCRC check 506 performs a first check of the "initially captured image sequence of images in viewfinder identified with a dance technique", CCRC check 506 determines the usage rights which permit uploading of 2 distinct element of the dance technique out of 5 distinct elements total to a network service. Next, as illustrated in log 550, once the image is captured, normal CCRC check 512 performs a second check and triggers the video camera to display within the viewfinder which portions of the captured sequence of images can be uploaded to a network service.

Next, as illustrated in log 550, computer 520 detects a copy of the captured content from camera 520 in a video file and normal CCRC check 522 performs a third check and verifies that the dance technique is properly identified and accesses additional usage rights restricting editing of the sequence of images because the dance technique is performed by a particular person, where captured of the particular person performing the dance technique is restricted. In one example, computer 520 may be enabled to verify the identity of a person and the matching of a motion captured within an image with a greater probability of accuracy than camera 502. Next, as illustrated in log 550, an application is triggered to open the video file and pre-application CCRC check 526 performs a fourth check and applies the usage rights to restrict upload to a network service or editing.

If an application uses the captured image, as illustrated at reference numeral 530, a post-process CCRC check 532 may be triggered to monitor compliance with the usage rights and determine if any additional usage rights apply. For example, the usage rights determined by pre-application CCRC check 526 may specify one level of authorization for use of the captured images at a lower resolution, but a different level of authorization for use of the captured images at a higher resolution. Post-process CCRC check 532 may continue to monitor the resolution of the captured image as used in the application.

Normal CCRC check 522, pre-application CCRC check 526 and post-process CCRC check 532 may each access DRM check cache 528 in determining usage rights for the captured images. In the example DRM check cache 528 may access records from captured content rules database 542 or element recognition DB 544. In one example, computer 520 may include one or more of additional memory and processing power than camera 502, so the records stored in DRM cache 528 by computer 520 as accessed from network locations and a user, may be larger records, with more resolution or detail, than the records accessed by camera 502 in DRM check cache 508.

In the example, a user may also attempt to upload the captured images to a network service of network accessible server 540. Responsive to network accessible server 540 receiving an upload of the captured image, pre-application CCRC check 546 is triggered to determine whether use of the captured images by the network service is restricted. If pre-application CCRC check 546 allows the uploading of the captured images to the network image, as illustrated at reference numeral 548, a post-process CCRC check 552 is triggered to monitor whether additional usage rights apply and whether there is compliance to the usage rights of the captured images by the network service.

In particular, in the example in log 550, an application attempts to upload the video file to a network service provided by network accessible server 540 and pre-application CCRC check 546 performs an initial check which triggers the network service to block the upload unless the user acquires additional licensing required in the usage rights, where the licensing permits a particular number of accesses to the video file. Assuming the user acquires the licensing, as illustrated in the example in log 550, post-process CCRC check 552 detects each access to the uploaded video file and determines whether the number of licensed accesses for the video file is exceeded and access needs to be blocked.

Figure 7:
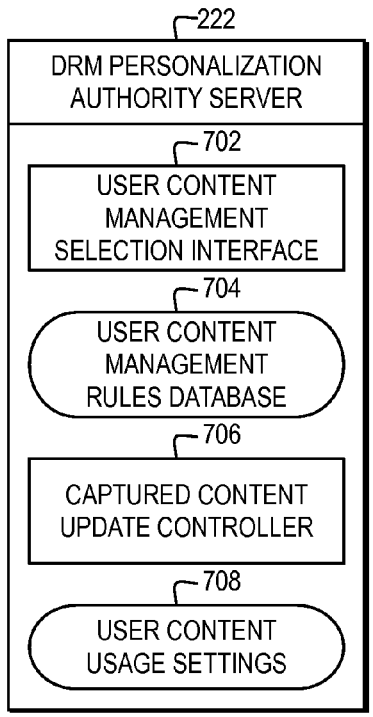
FIG. 7 is a block diagram depicting one example of a DRM content personalization service through which an owner of rights to content specifies those rights for applications to that content when captured by someone other than the owner of the rights to the content and through which a user capturing content specifies preferences for accessing licensing information and specifies usage limits.

Referring now to FIG. 7, a block diagram illustrates one example of a DRM content personalization service through which an owner of rights to content specifies those rights for application to that content when captured by someone other than the owner of the rights to the content and through which a user capturing content specifies preferences for accessing licensing and specifies usage limits. It will be understood that DRM personalization authority server 222 may include additional or alternate components to the components depicted and may be distributed across one or more systems.

In the example, DRM personalization authority server 222 may include a user content management selection interface 702. Through the user content management selection interface 702, which is implemented in a browser window, in a stand-alone application, or other available interface function, a user may select one or more DRM rules with sequence criteria for controlling content owned by the user when the content is captured without the permission of the user. The DRM rules with sequence criteria are stored in user content management rules database 704.

In addition, user content management selection interface 702 facilitates user specification of mappings of the content owned by the user for storage with sequence based rules for the content stored in user content management rules database 704. In one example, user content management selection interface 702 may facilitate an image capture system through which an image, gesturing, or movement of the user is captured, as performed by one or more people or machines, and mapped into a three-dimensional image. In another example, user content management selection interface 702 may facilitate an interface for capturing audio or voice and converting the audio into digitally mapped characteristics or a sound signature. In yet another example, user content management selection interface 702 may facilitate user uploading of a protected mark.

Further, user content management selection interface 702 may facilitate user specification of the preferences for use of captured images by the user, when the user is not the owner of the rights to the captured images. User preferences for use of captured images by the user are stored in user content usage settings 708. In one example, a user may set preferences according to type of restricted content, such as whether the restricted content is image, audio or protected mark. In addition, a user may set preferences according to the sequence of elements within streaming captured content. Further, a user may set preferences with financial transaction information, maximum and minimum licensing amounts, and other information for facilitating purchase of licenses for additional authorization for use of a captured image. In addition, a user may set preferences as to the devices that the user permits to access the user's settings and a user may set preferences as to the preferred usage of captured images.

A captured content update controller 706 facilitates updates of DRM managed content databases, DRM check caches, and CCRCs with current DRM rules, current sequence criteria, current element mappings, current element recognition and voice recognition records and definitions, current user preferences for use of captured content, blocked or unauthorized account users, and other data updated with DRM personalization authority server 222. In facilitating updates, captured content update controller 706 may automatically send updates periodically to registered systems or may send updates when requested by a user or by a system. In sending updates, captured content update controller 706 may apply watermarking or embed the updates to certify that the updates are from DRM personalization authority server 222.

In addition, although not depicted, DRM personalization authority server 222 may implement a transaction controller for controlling any financial transactions required for restricting usage rights of captured content. In addition, DRM personalization authority server 222 may implement a communication controller for controlling communication required for restricting usage rights of captured content. Further, RM personalization authority server 222 may implement or access additional or alternate functions in order to distribute data, secure data, and receive data for restricting usage of captured content.

Figure 8:
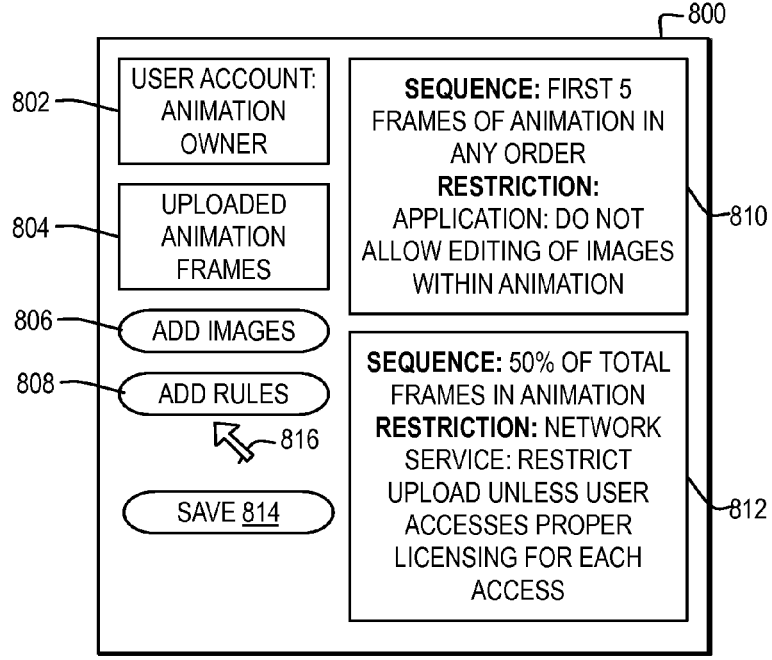
FIG. 8 is a block diagram depicting an example of an interface through which a user may specify the mapping for identifying elements within streaming captured content and for setting rules for determining usage rights for the elements within streaming captured content.

Referring now to FIG. 8, a block diagram illustrates an example of an interface through which a user may specify the mapping for identifying elements within streaming captured content and for setting rules for determining usage rights for the content. In the example, within an interface 800, a user has logged into a user account for specifying management of content owned by the user when the content is captured.

In the example, within interface 800, a currently opened user account is identified as "animation owner" as illustrated at reference numeral 802. A user account may be identified by a name, number, or other type of user identifier. In addition, to access a user account, a user may be required to provide a password or otherwise authenticate the user's right to access the user account.

In addition, in the example, within interface 800, a listing of elements owned by the user are provided and an image representative of the owned elements are illustrated, such as the uploaded image of the restricted animation frames illustrated at reference numeral 804. In another example, interface 800 may include multiple selectable images representative of owned elements, where a user can select to view the current profile specified for each element or edit the profile, through selecting the selectable images. In addition, in the example, a user may select an option to add images, as illustrated at reference numeral 806. A user may select to add rules to the currently selected image by selecting an option to add rules as illustrated at reference numeral 808. A user may select to save current profile selections to the user account by selecting to save as illustrated at reference numeral 814.

In one example, a user makes selections within interface 800 by positioning cursor 816 and entering an additional input. It will be understood that additional or alternate methods for user selections of options within interface 800 may be implemented. In addition, it will be understood that additional or alternate types of selectable options may be provided within interface 800.

In the example, a first rule illustrated at reference numeral 810 indicates that for the animation, if a sequence of any of the first five frames in any order is detected, then there are restrictions on an application allowing editing of the images within the animation. In one example, an animation may include a graphically animated film, multimedia presentation, or advertising sequence where the owner specifies this preference to protect a portion of the frames of the animation from editing by others who may capture the animation.

In addition, in the example, a second rule illustrated at reference numeral 812 indicates that for the animation, if a sequence of more than 50% of the total frames in the animation is detected, then there are restrictions on a network service permitting uploading the animation unless the user accesses proper licensing for each access. In one example, an owner of an animation may specify this preference to allow others to use a portion of the animation without licensing, but require a license for a network service to provide full access to the content in the animation.

Figure 9:
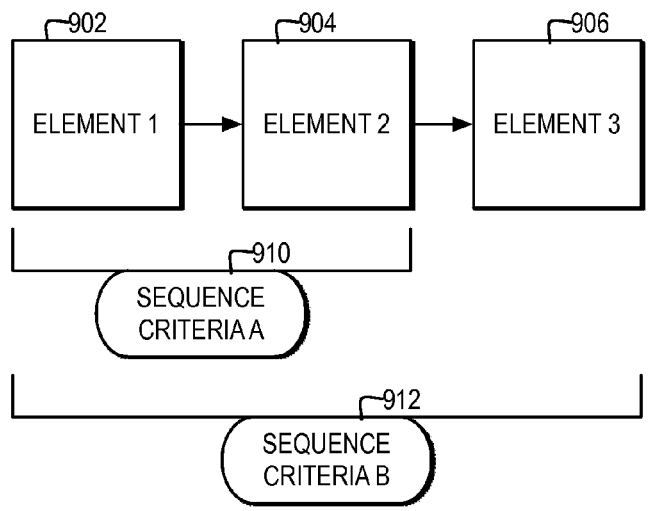
FIG. 9 is a block diagram illustrating examples of sequences of elements which when detected in portions of streaming captured content, trigger application of usage rights based on sequence criteria.

Referring now to FIG. 9, a block diagram illustrates examples of sequences of elements which when detected in portions of streaming captured content, trigger application of usage rights based on sequence criteria. The example shows an example of streaming captured content including "element 1" 902, an "element 2" 904, and an "element 3" 906. Each of "element 1" 902, "element 2" 904, and "element 3" 906 may represent elements within different portions of streaming captured content or within a same portion of streaming captured content which includes a sequence of elements. In addition, each of "element 1" 902, "element 2" 904, and "element 3" 906 may independently, or when in sequence, identify a person, object, motion, or sound. Further, each of "element 1" 902, "element 2" 904, and "element 3" 906 may represent elements captured together in the sequence illustrated, elements captured together and reordered in the sequence illustrated, elements captured separately and ordered in the sequence illustrated, or other combinations of elements captured, generated, sent, accessed, rendered, or output in a sequence. It is important to note that the sequence of "element 1" 902, "element 2" 904, and "element 3" 906 may include lapses between elements or may include other elements which are not restricted by sequence criteria.

"Element 1" 902, "element 2" 904, and "element 3" 906 are detected in a sequence of portions of streaming captured content where each element is displayed, rendered, or marked at a different time. In one example, each of "element 1" 902, "element 2" 904, and "element 3" 906 is rendered and then replaced by the next element. In another example, each of "element 1" 902, "element 2" 904, and "element 3" 906 is rendered in a same output interface at different points in time.

In one example depicted, a "sequence criteria A" 910 applies to the sequence of "element 1" 902 and "element 2" 904. In another example depicted, a "sequence criteria B" 912 applies to the sequence of "element 1" 902, "element 2" 904, and "element 3" 906.

In one example, "sequence criteria A" 910 may be specified by an owner of both "element 1" 902 and "element 2" 904, and may restrict use of the elements regardless of the sequence in which the elements are presented. For example, one who choreographs a dance, may restrict use of the distinct motions in the dance when detected in any order. In another example, one who films a video may restrict use of the frames of the video when detected in any order.

In another example, "sequence criteria A" 910 may be specified by an owner of "element 1" 902 who specifies criteria for restricting use of "element 1" 902 when in sequence with other elements, such as "element 2" 904. For example, one who owns a trademark may restrict placement of the trademark in a sequence of other elements, such as in within a sequence of photos played by a photo viewing application or plug-in or such as within a sequence of advertisements rotated within an advertising frame of a webpage.

In another example, "sequence criteria B" 912 may be specified by an owner of rights restrict the sequence of "element 1" 902, "element 2" 904, and "element 3" 906 where other users may own rights to restrict use of the actual elements. For example a user may license use of "element 1" 902, "element 2" 904, and "element 3" 906 and edit or combine the elements in a manner such that the sequence of elements is distinguishable and protectable.

With reference now to FIG. 10, a high level logic flowchart illustrates a process and program for restricting usage of streaming captured content. In the example, the process starts at block 1000 and thereafter proceeds to block 1002. Block 1002 illustrates a determination whether a first portion of streaming captured content is detected by a CCRC. If a first portion of streaming captured content is detected, then the process passes to block 1004. Block 1004 illustrates analyzing the first portion of streaming captured content to identify any elements subject to digital rights management for streaming captured content when in a sequence according to sequence criteria for the one or more elements. Next, block 1006 illustrates a determination whether any restricted elements are detected in the first portion of streaming captured content. If there are restricted elements detected in the first streaming captured content, then the process passes to block 1008.

Block 1008 depicts a determination whether a second portion of captured content is detected in sequence after the first portion. If a second portion of captured content is detected in sequence after the first portion, then the process passes to block 1010; otherwise, if no additional portion of captured content is detected in sequence after the first portion, then the process returns to block 1002. At block 1010, the CCRC analyzed the second portion of streaming captured content to identify any elements subject to the selected sequence criteria. Next, block 1012 depicts a determination whether the detected sequence of elements within portions of streaming content are restricted by the sequence criteria.

At block 1012, if the current sequence of elements is not restricted, then the process passes to block 1016. Block 1016 depicts a determination whether the sequence criteria is applicable to any other elements in a sequence of streaming captured content that are not yet detected. If the sequence criteria are applicable to other elements which are not yet detected, then the process returns block 1008 to detect and analyze additional portions of streaming captured content to determine whether the streaming captured content includes a restricted sequence of elements. Otherwise, at block 1016, if the sequence criteria are not applicable to other elements, then the process passes to block 1018. Block 1018 illustrates applying a certification to the streaming captured content indicating there is no restriction on the usage of the streaming captured content, and the process ends.

Returning to block 1012, if the current sequence of elements within the portions of streaming captured content is restricted by the sequence criteria, then the process passes to block 1014. Block 1014 depicts applying the sequence criteria as sequence usage rights to restrict usage of the streaming captured content, and the process ends.

With reference now to FIG. 11, a high level logic flowchart depicts a process and program for a policy based rights controller determining usage rights for controlling digital rights management of streaming captured content. In the example, the process starts at block 1100 and thereafter proceeds to block 1102. Block 1102 depicts a determination whether streaming captured content is received. If streaming captured content is received, then the process passes to block 1104. Block 1104 illustrates writing each portion of the streaming captured content to a raw data set. Next, block 1106 depicts adding a default DRM policy to the data. Thereafter, block 1108 illustrates watermarking the raw data set with an identification of the system performing analysis on the captured content, and the process passes to block 1110.

Block 1110 illustrates a determination whether a request is received to relax the DRM policy on the raw data set. If a request is not received, then the process passes to block 1130. Block 1130 illustrates specifying the modified raw data set as the captured content and the default DRM policy for the captured content as the usage rights, and the process ends. In one example, by specifying the modified raw data set as the captured content, the modified raw data set may replace the previously stored captured content within cache and other memory within a system.

Returning to block 1110, if a request to relax the DRM policy is received, then the process passes to block 1112. Block 1112 depicts extracting and obtaining pertinent subsets from the raw data set. In particular, in extracting and obtaining subsets, different layers of data or different resolutions of data may be extracted from the raw data set. Next, block 1114 illustrates sending the data subsets to the content analysis controller. Thereafter, block 1116 depicts a determination whether identified objects are received from the content analysis controller. As illustrated at block 1118, the policy based rights controller may provide additional layers or resolutions of data for analysis from the raw data set or from user entries of additional information for analysis. Once identified objects are received from the content analysis controller, the process passes to block 1020.

Block 1120 illustrates identifying a selection of DRM rules with element mappings that match the identified objects within a required percentage of points. Next, block 1122 depicts detecting the presence of a sequence of elements within the streaming captured content restricted by the sequence criteria for the selection of DRM rules. Thereafter, block 1124 illustrates specifying the usage rights by a relaxed DRM policy set from the applicable sequence criteria for a restricted sequence of elements detected in the streaming captured content. Next, block 1126 depicts adjusting the raw data set according to the relaxed DRM policy, including blocking, blurring, or replacing elements within the raw data set. Thereafter, block 1128 depicts specifying the modified raw data set as the streaming captured content, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to a preferred embodiment, it will be understood by those skilled in the art that various changes in form and detail may be made therein without departing from the spirit and scope of the invention.

What is claimed is:

1. A method for digital rights management of streaming captured content, comprising:
    detecting, using a processor, a first portion of streaming captured content;
    detecting, using the processor, a second portion of the streaming captured content after the first portion of the streaming captured content is detected;
    determining, using the processor, whether rendering the second portion of the streaming captured content after the first portion of the streaming captured content is subject to at least one digital rights management protection rule for streaming captured content as specified by at least one owner of at least one restricted element within the streaming captured content captured independent of distribution of the at least one restricted element by the at least one owner of the at least one restricted element by determining whether the first portion and the second portion of the streaming captured content in sequence represent a particular selection of content elements specified in a selection of a plurality of content elements protected by the at least one digital rights management protection rule; and
    applying, using the processor, the at least one digital rights management protection rule to restrict rendering of the second portion of the streaming captured content after the first portion of the streaming captured content.

2. The method according to claim 1, further comprising:
    responsive to detecting the first portion of streaming captured content, analyzing the first portion of streaming captured content to identify the at least one restricted element subject to at least one digital rights management protection rule when in a sequence with at least one other element; and
    responsive to identifying the at least one restricted element subject to the at least one digital rights management protection rule when in sequence with the at least one other element, analyzing the second portion of the streaming captured content detected after the first portion of the stream captured content to identify the presence of the at least one other element.

3. The method according to claim 1, wherein detecting a first portion of streaming captured content and detecting a second portion of the streaming captured content detected after the first portion of the streaming captured content is detected further comprises:
    detecting the first portion of streaming captured content and the second portion of the streaming captured content in a content stream comprising a plurality of content elements playable in sequence.

4. The method according to claim 1, wherein detecting a first portion of streaming captured content and detecting a second portion of the streaming captured content detected after the first portion of the streaming captured content is detected further comprises:
    detecting the first portion of streaming captured content and the second portion of the streaming captured content for rendering by a player for generating the sequence of the first portion of streaming captured content and the second portion of the streaming captured content within a display area.

5. The method according to claim 1, wherein applying the at least one digital rights management protection rule to restrict rendering of the second portion of the streaming captured content after the first portion of the streaming captured content further comprises:
    applying the at least one digital rights management protection rule to restrict editing of the streaming captured content.

6. The method according to claim 1, wherein applying the at least one digital rights management protection rule to restrict rendering of the second portion of the streaming captured content after the first portion of the streaming captured content further comprises:

applying the at least one digital rights management protection rule to restrict uploading of the streaming captured content to a network service server.

7. The method according to claim 1, wherein applying the at least one digital rights management protection rule to restrict rendering of the second portion of the streaming captured content after the first portion of the streaming captured content further comprises:
   requiring at least one additional element rendered in a sequence with said first portion of the streaming captured content and said second portion of the streaming captured content.

8. A system of digital rights management of streaming captured content, comprising:
   a content management enabled device for detecting a first portion of streaming captured content;
   the content management enabled device for detecting a second portion of the streaming captured content after the first portion of the streaming captured content is detected;
   a captured content rights controller for determining whether rendering the second portion of the streaming captured content after the first portion of the streaming captured content is subject to at least one digital rights management protection rule for streaming captured content as specified by at least one owner of at least one restricted element within the streaming captured content captured independent of distribution of the at least one restricted element by the at least one owner of the at least one restricted element by determining whether the first portion and the second portion of the streaming captured content in sequence represent a particular selection of content elements specified in a selection of a plurality of content elements protected by the at least one digital rights management protection rule; and
   the captured content rights controller for applying the at least one digital rights management protection rule to restrict rendering of the second portion of the streaming captured content after the first portion of the streaming captured content.

9. The system according to claim 8, further comprising:
   the captured content rights controller, responsive to detecting the first portion of streaming captured content, for analyzing the first portion of streaming captured content to identify the at least one restricted element subject to at least one digital rights management protection rule when in a sequence with at least one other element; and
   the captured content rights controller, responsive to identifying the at least one restricted element subject to the at least one digital rights management protection rule when in sequence with the at least one other element, for analyzing the second portion of the streaming captured content detected after the first portion of the stream captured content to identify the at least one other element.

10. The system according to claim 8, further comprising the content management enabled device for detecting a first portion of streaming captured content and detecting a second portion of the streaming captured content after the first portion of the streaming captured content is detected operative to detect the first portion of streaming captured content and the second portion of the streaming captured content in a content stream comprising a plurality of content elements playable in sequence.

11. The system according to claim 8, further comprising the content management enabled device for detecting a first portion of streaming captured content and detecting a second portion of the streaming captured content after the first portion of the streaming captured content is detected operative to detect:
   the first portion of streaming captured content and the second portion of the streaming captured content for rendering by a player for generating the sequence of the first portion of streaming captured content and the second portion of the streaming captured content within a display area.

12. The system according to claim 8, further comprising the captured content rights controller for determining whether rendering the second portion of the streaming captured content after the first portion the streaming captured content is subject to at least one digital rights management protection rule operative to determine:
   whether the first portion and the second portion of the streaming captured content in sequence represent at least one particular motion subject to restriction under the at least one digital rights management protection rule.

13. The system according to claim 8, further comprising the captured content rights controller for determining whether rendering the second portion of the streaming captured content after the first portion the streaming captured content is subject to at least one digital rights management protection rule operative to determine:
   whether the first portion and the second portion of the streaming captured content in sequence represent a particular selection of content elements specified in a selection of a plurality of content elements protected by the at least one digital rights management protection rule.

14. The system according to claim 8, further comprising the captured content rights controller for applying the at least one digital rights management protection rule to restrict rendering of the second portion of the streaming captured content after the first portion of the streaming captured content operative to apply:
   the at least one digital rights management protection rule to restrict editing of the streaming captured content.

15. The system according to claim 8, further comprising the captured content rights controller for applying the at least one digital rights management protection rule to restrict rendering of the second portion of the streaming captured content after the first portion of the streaming captured content operative to apply:
   the at least one digital rights management protection rule to restrict uploading of the streaming captured content to a network service server.

16. The system according to claim 8, further comprising the captured content rights controller for applying the at least one digital rights management protection rule to restrict rendering of the second portion of the streaming captured content after the first portion of the streaming captured content operative to require:
   at least one additional element rendered in a sequence with said first portion of the streaming captured content and said second portion of the streaming captured content.

17. A program product comprising a storage-type computer-usable medium including a computer-readable program for digital rights management of steaming captured content, wherein the computer-readable program when executed on a computer causes the computer to:
   detect a first portion of streaming captured content;
   detect a second portion of the streaming captured content after the first portion of the streaming captured content is detected;

determine whether rendering the second portion of the streaming captured content after the first portion of the streaming captured content is subject to at least one digital rights management protection rule for streaming captured content as specified by at least one owner of at least one restricted element within the streaming captured content captured independent of distribution of the at least one restricted element by the at least one owner of the at least one restricted element by determining whether the first portion and the second portion of the streaming captured content in sequence represent a particular selection of content elements specified in a selection of a plurality of content elements protected by the at least one digital rights management rule; and apply the at least one digital rights management protection rule to restrict rendering of the second portion of the streaming captured content after the first portion of the streaming captured content.

* * * * *